United States Patent
Matsuyama et al.

(10) Patent No.: US 7,071,834 B2
(45) Date of Patent: Jul. 4, 2006

(54) DEVICE FOR MONITORING THE OPERATING CONDITIONS OF ROLLING BEARING

(75) Inventors: Naoki Matsuyama, Kanagawa (JP); Sumio Sugita, Kanagawa (JP); Yasushi Morita, Kanagawa (JP)

(73) Assignee: NSK Ltd., Tokyo (JP)

( * ) Notice: Subject to any disclaimer, the term of this patent is extended or adjusted under 35 U.S.C. 154(b) by 351 days.

(21) Appl. No.: 10/304,008

(22) Filed: Nov. 26, 2002

(65) Prior Publication Data

US 2003/0098691 A1 May 29, 2003

(30) Foreign Application Priority Data

Nov. 26, 2001 (JP) .................................. P. 2001-358638

(51) Int. Cl.
  *G08B 21/00* (2006.01)

(52) U.S. Cl. ...................... 340/682; 340/689; 184/38.4; 324/160; 324/174; 324/207.5; 324/207.12

(58) Field of Classification Search ................. 340/682, 340/689; 184/38.4; 324/160, 174, 207.5, 324/207.12
See application file for complete search history.

(56) References Cited

U.S. PATENT DOCUMENTS 5,001,435 A * 3/1991 Smith .......................... 324/671
6,490,935 B1 * 12/2002 Joki et al. ................. 73/862.49

* cited by examiner

*Primary Examiner*—Thomas J. Mullen
*Assistant Examiner*—Tai T. Nguyen
(74) *Attorney, Agent, or Firm*—Sughrue Mion, PLLC

(57) ABSTRACT

A device for monitoring the operating conditions of a rolling bearing, has the rolling bearing including: an outer ring of a metal with outer raceway; an inner ring of a metal with an inner raceway; and a plurality of rolling elements; a first member electrically connected to the outer ring; a second member electrically connected to the inner ring; and a lubricant presented on the area at which the outer raceway and the inner raceway come in contact with the rolling surface of the rolling elements; wherein, the electrical characteristics between the outer ring or first member and the inner ring or second member are monitored in order to monitor the operating conditions of the rolling bearing operating with a lubricant and when the electrical characteristics thus monitored fall outside a predetermined range, the lubricating conditions are judged poor.

13 Claims, 2 Drawing Sheets

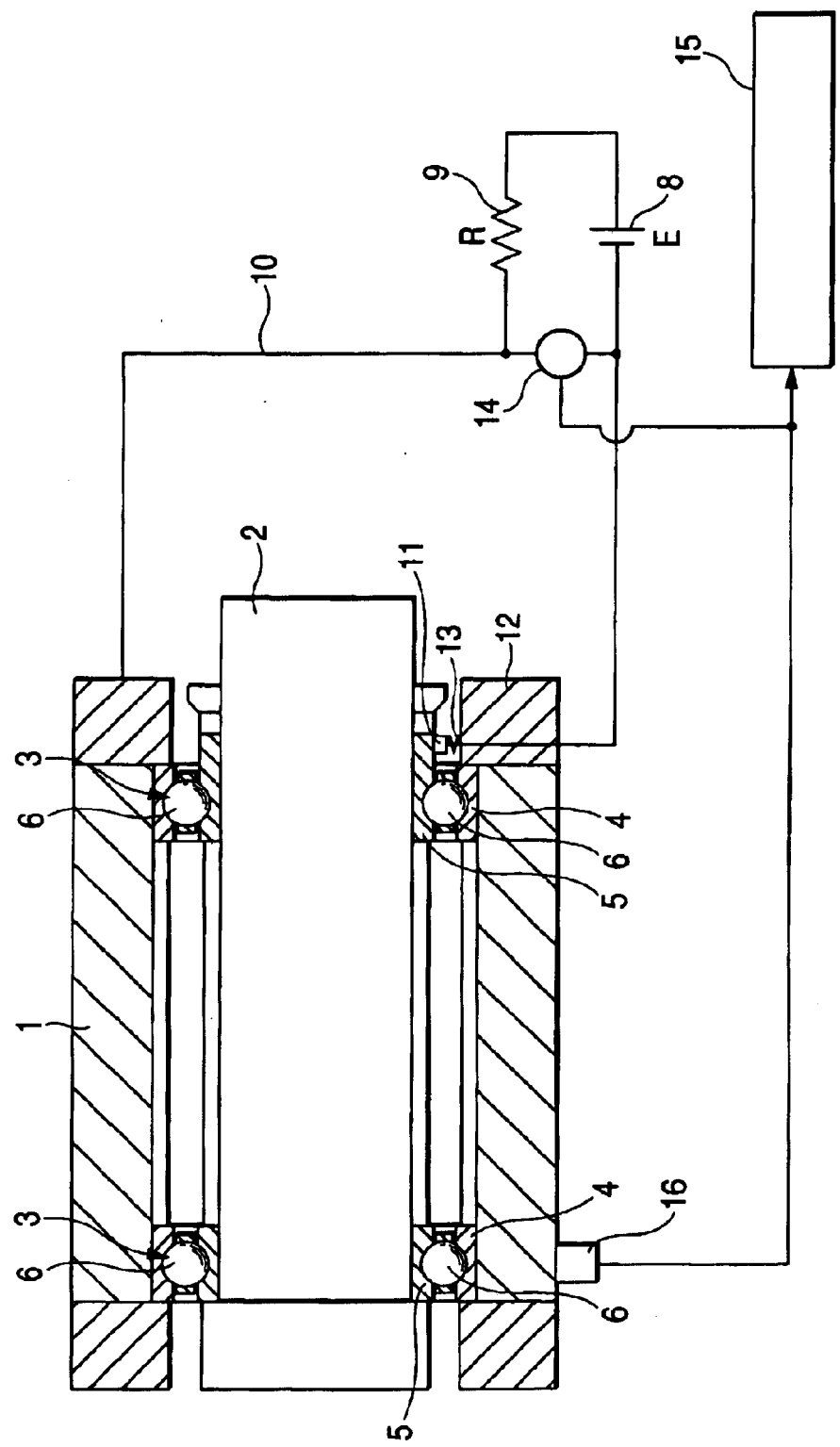

DEVICE FOR MONITORING THE OPERATING CONDITIONS OF ROLLING BEARING

BACKGROUND OF THE INVENTION

1. Field of the Invention

The device for monitoring the operating conditions of a rolling bearing according to the present invention is used to judge the lubrication of a rolling bearing operating slightly lubricated such as rolling bearing for bearing the main spindle of machine tool.

2. Description of the Related Art

The main spindle of machine tools rotates at a high speed while being hold by a rolling bearing such as ball bearing and roller bearing. In operation, such a rolling bearing is slightly lubricated with an oil air, oil mist or the like to minimize the revolution resistance and its fluctuation. In the case of lubrication with grease, the enclosed amount of grease is minimized. In other words, the interior of the aforementioned rolling bearing is supplied with a lubricant in a minimum required amount. Accordingly, when a lubricator such a soil air supplier is out of order or the grease is exhausted, causing defective lubrication, it is likely that a severe damage such as seizing can occur in a short period of time.

It has thus been practiced to obtain data for maintenance of the aforementioned rolling bearing by detecting vibration or noise generated on the site at which the aforementioned rolling bearing is installed or temperature of this site or measuring the operating time of machine tools in which the aforementioned rolling bearing is incorporated.

Since the aforementioned data such as vibration, noise and temperature vary after the occurrence of some damage due to defective lubrication, damage on the rolling bearing cannot be necessarily prevented sufficiently. Further, the measurement of the operating time cannot cope with defective lubrication due to trouble of lubricator.

Taking into account these problems, it is desired to realize a monitor which can detect the occurrence of actual defective lubrication before the occurrence of damage due to defective lubrication.

On the other hand, as the rolling elements constituting the rolling bearing for bearing the high rotation main spindle to be incorporated in various machine tools such as machining center there are occasionally used rolling elements made of ceramics such as silicon nitride. The reason why such a rolling element made of ceramics is used is that the rolling element made of ceramics has a light weight, a small thermal expansion (small linear expansion coefficient) and excellent resistance to abrasion and seizing. However, since the rolling element made of ceramics differs from ordinary rolling bearings made of bearing steel in characteristics, the method for monitoring the abnormality thereof needs to be considered accordingly.

SUMMARY OF THE INVENTION

Under these circumstances, the present invention has been worked out to realize a device for monitoring the operating conditions of a rolling bearing which can rapidly and accurately judge to see whether or not the rolling bearing is out of order.

According to a first aspect of the present invention, there is provided that a device for monitoring the operating conditions of a rolling bearing, comprises: the rolling bearing including; an outer ring made of a metal having an outer raceway provided on the inner surface thereof; an inner ring made of a metal having an inner raceway provided on the outer surface thereof; and a plurality of rolling elements rollably interposed between the outer raceway and the inner raceway; a first member electrically connected to the outer ring; a second member electrically connected to the inner ring; and a lubricant presented on the area at which the outer raceway and the inner raceway come in contact with the rolling surface of the rolling elements; wherein the electrical characteristics between the outer ring or first member and the inner ring or second member are monitored in order to monitor the operating conditions of the rolling bearing operating with a lubricant and when the electrical characteristics thus monitored fall outside a predetermined range, the lubricating conditions are judged poor.

According to a second aspect of the present invention, it is preferable that the plurality of rolling elements are made of a metal, the electrical characteristics comprise resistivity or potential difference that changes on the basis the resistivity and when the resistivity or potential difference falls below a predetermined value, the lubricating conditions are judged poor.

According to a third aspect of the present invention, it is preferable that the plurality of rolling elements are made of ceramics, these rolling elements are rollably retained in a retainer made of a synthetic resin, the electrical characteristics comprise potential difference and when potential difference exceeds a predetermined value, the lubricating conditions are judged poor.

According to a fourth aspect of the present invention, it is preferable that the plurality of rolling elements are made of ceramics, at least one of the rolling elements made of ceramics is made of electrically-conductive ceramics, the electrical characteristics comprise resistivity or potential difference and when the resistivity or potential difference falls below a predetermined value, the lubricating conditions are judged poor.

According to a fifth aspect of the present invention, it is preferable that the first member is a housing and the second member is a main spindle.

According to a sixth aspect of the present invention, it is preferable that a device for monitoring the operating conditions of a rolling bearing which holds a metallic main spindle rollably inside a metallic housing, comprising: the rolling bearing including: an outer ring made of a metal having an outer raceway provided on the inner surface thereof; an inner ring made of a metal having an inner raceway provided on the outer surface thereof; and a plurality of rolling elements rollably interposed between the outer raceway and the inner raceway, the outer ring being mounted on the housing and the inner ring being mounted on the main spindle; and a lubricant presented on the area at which the outer raceway and the inner raceway come in contact with the rolling surface of the rolling elements; wherein the electrical characteristics between the outer ring and the inner ring are monitored in order to monitor the operating conditions of the rolling bearing operating with a lubricant and when the electrical characteristics thus monitored fall outside a predetermined range, the lubricating conditions are judged poor.

According to a seventh aspect of the present invention, it is preferable that the plurality of rolling elements are made of a metal, the electrical characteristics comprise resistivity or potential difference that changes on the basis thereof and when the resistivity or potential difference falls below a predetermined value, the lubricating conditions are judged poor.

According to a eighth aspect of the present invention, it is preferable that the plurality of rolling elements are made of ceramics, these rolling elements are rollably retained in a retainer made of a synthetic resin, the electrical characteristics comprise potential difference and when the potential difference exceeds a predetermined value, the lubricating conditions are judged poor.

According to a ninth aspect of the present invention, it is preferable that the plurality of rolling elements are made of ceramics, at least one of the rolling elements made of ceramics is made of electrically-conductive ceramics, the electrical characteristics comprise resistivity or potential difference that changes on the basis thereof and when the resistivity or potential difference falls below a predetermined value, the lubricating conditions are judged poor.

According to a tenth aspect of the present invention, it is preferable that a main spindle for machine tool comprising a device for monitoring the operating conditions of a rolling bearing according to the sixth to ninth aspects of the present invention.

In accordance with the device for monitoring the operating conditions of a rolling bearing having the aforementioned arrangement, the defective lubrication of the rolling bearing can be detected before the occurrence of damage due to defective lubrication.

BRIEF DESCRIPTION OF THE DRAWINGS

FIG. 2 is a circuit diagram illustrating a second embodiment of the present invention.

DETAILED DESCRIPTION OF THE PREFERRED EMBODIMENTS

Figure 1:
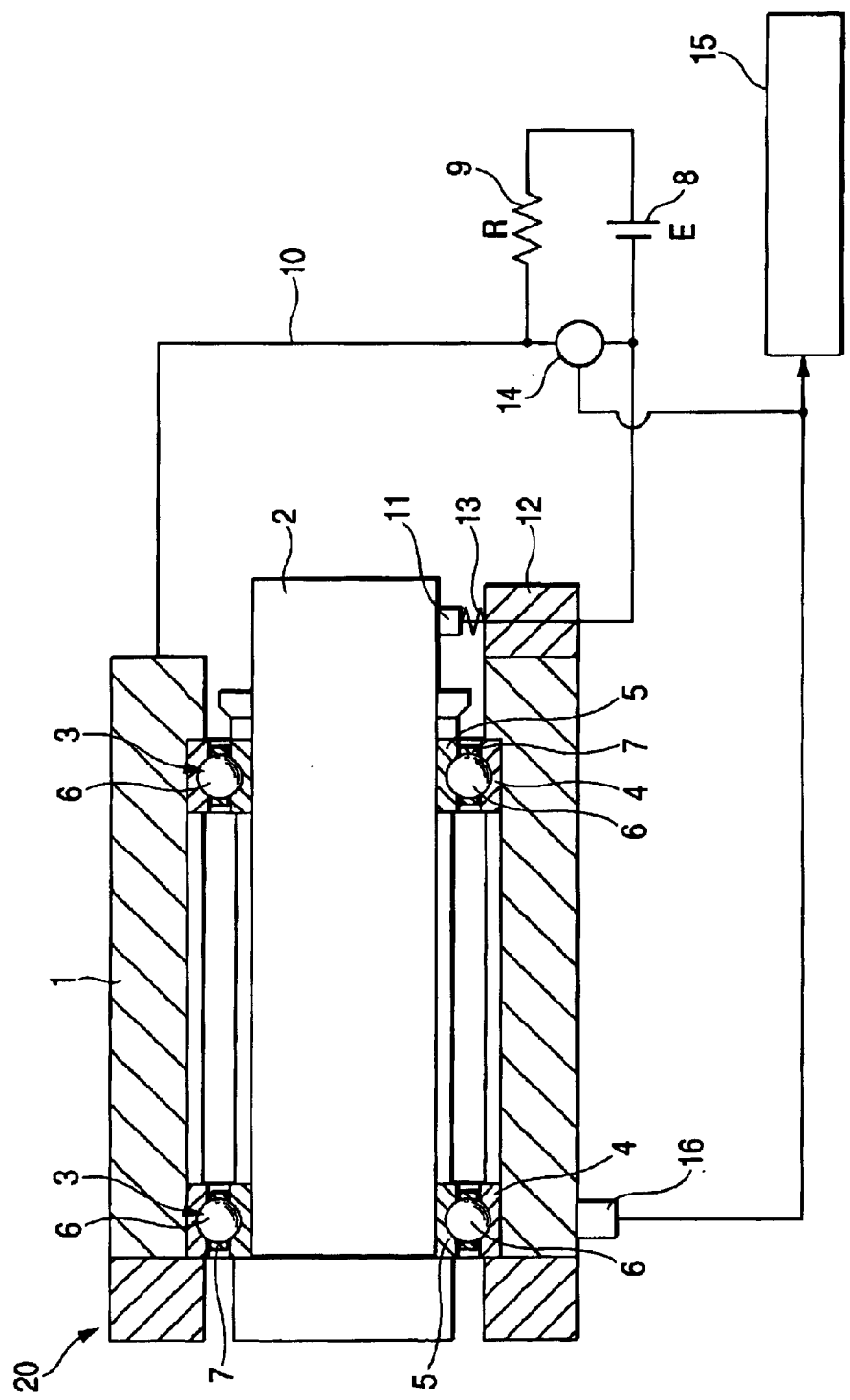
FIG. 1 is a circuit diagram illustrating a first embodiment of the present invention.

FIG. 1 illustrates the first embodiment of the present invention having a device for monitoring the operating conditions of a rolling bearing shown incorporated in a machine tool. Inside a housing 1 made of a metal such as steel is a main spindle 2 which, too, is made of steel rollably born by a pair of rolling bearings 3, 3. These rolling bearings 3, 3 each comprise an outer ring 4 having an outer raceway provided on the inner surface thereof, an inner ring 5 having an inner raceway provided on the outer surface thereof, a plurality of rolling elements 6, 6 each made of a metal or ceramics rollably interposed between the outer ring and the inner ring, and a retainer 7 made of a synthetic resin for rollably retaining these rolling elements. In order to detect how these rolling bearings 3, 3 are lubricated, an arrangement is provided such that the potential difference between the housing 1 in which the outer ring 4 is fitted and the main spindle 2 on which the inner ring 5 is fitted can be measured.

To this end, the arrangement shown forms a closed circuit comprising a series combination of the housing 1, the main spindle 2, the rolling bearings 3, 3, a dc supply 8, and a resistor 9. One end of a conductor 10 forming the closed circuit is directly connected to the housing 1 while the other end of the conductor 10 is connected to the main spindle 2 via a brush 11. In other words, a brush 11 supported on a holder 12 made of an insulating material such as synthetic resin is pressed against the outer surface of the main spindle 2 or a conductor fixed to the main spindle 2 and the other end of the conductor 10 is connected to the brush 11, causing the other end of the conductor 10 and the main spindle 2 to be electrically connected to each other.

In the middle of the conductor 10, a voltmeter 14 is connected in parallel with the dc supply 8 and the resistor 9. Accordingly, the voltmeter 14 detects the potential difference between the housing 1 and the main spindle 2 (equal to the potential difference between the outer ring 4 and the inner ring 5 forming the rolling bearings 3, 3). The voltage value of the dc supply 8 is determined in a range of about 0.1 to 10 V in view of design. The resistivity of the resistor 9 is determined in a range of 1 kΩ to 1 MΩ in view of design.

The measurements given by the voltmeter 14 are inputted to a controller 15 comprising a comparator and an analyzer incorporated therein. The controller 15 compares the measurements given by the voltmeter 14 with a predetermined reference value. When the measurements deviate from the reference value toward the state of defective lubrication, the controller 15 gives an alarm and suspends the rotation of the main spindle 2. In the case of defective lubrication, it depends on the material of the rolling elements 6, 6 forming the rolling bearings 3, 3 that the measurements are greater or smaller than the reference value. This will be further described later. In the arrangement as shown in FIG. 1, the detection signal from a vibroscope 16 for detecting the vibration of the housing 1 is also inputted to the controller 15. When the vibration of the housing 1 represented by the detection signal exceeds a predetermined value, the controller 15 gives an alarm and suspends the rotation of the main spindle 2.

In accordance with the device for monitoring the operating conditions of a rolling bearing of the present invention having the aforementioned arrangement, the defective lubrication of the rolling bearings 3, 3 can be detected in the following manner before the occurrence of damage on these rolling bearings due to defective lubrication.

Firstly, the present invention will be further described with reference to the case where the rolling elements 6, 6 forming the rolling bearings 3, 3 are made of a metal such as bearing steel. In this case, the electrical resistance between the housing 1 and the main spindle 2 is high when the lubricating conditions are good or low when the lubricating conditions are poor. In other words, when the lubricating conditions are good, a sufficient oil film is interposed between the outer and inner raceways and the rolling surface of the rolling elements 6, 6. Since the oil film as an insulating material is present, the electrical resistance between the housing 1 and the main spindle 2 is high and hence the potential difference between the housing 1 and the main spindle 2 is raised (so as to be close the voltage of the dc supply 8).

On the contrary, when the lubricating conditions are poor, no oil film is present between the outer and inner raceways and the rolling surface of the rolling elements 6, 6. The amount of oil film, if any, is insufficient. Under these conditions, the outer and inner raceways and the rolling surface of the rolling elements 6, 6 come in contact with each other as metals do, the electrical resistance between the housing 1 and the main spindle 2 is dropped down, and hence the potential difference between the housing 1 and the main spindle 2 is dropped down. Accordingly, when the measured value $V_{14}$ of the voltmeter 14 is lower than the voltage $V_8$ of the dc voltage 8 by more than a predetermined amount (e.g., $V_{14} < 0.8 V_8$), it is judged that no sufficient oil film is formed between the outer and inner raceways and the rolling surface of the rolling elements 6, 6, that is, the rolling bearing is defectively lubricated.

The present invention will be further described hereinafter with reference to the case where the rolling elements 6, 6 forming the rolling bearings 3, 3 are made of ceramics. In this case, these rolling elements are made of an insulating material. Therefore, the electrical resistance between the housing 1 and the main spindle 2 stays high regardless of lubricating conditions. However, in the case of rolling bearings 3, 3 comprising rolling elements 6, 6 made of ceramics rollably retained by a retainer 7 made of a synthetic resin, the amount of static electricity generated on the rolling elements 6, 6 increases due to defective lubrication. In other words, when the rolling bearings 3, 3 are fairly lubricated, that is, a sufficient oil film is present between the rolling surface of the rolling elements 6, 6 and the inner surface of the pocket of the retainer 7, a frictional force acted on the sliding area of these members is small, generating no static electricity is generated on the sliding area. Accordingly, the measured value of the voltmeter 14 substantially coincides with the voltage V8 of the dc supply 8 ($V_{14}$ nearly equals $V_8$).

On the contrary, when the lubricating conditions are poor, the amount of static electricity generated on the rolling elements 6, 6 increases. In other words, when the lubricating conditions are poor, that is, no oil film is present between the rolling surface of the rolling elements 6, 6 and the inner surface of the pocket of the retainer 7 or, if any, an insufficient oil film is present between the two surfaces, a great frictional force is acted on the sliding area of the two members, static electricity is generated on the sliding area and the rolling elements 6, 6 are charged. Since the static electricity thus accumulated on the rolling elements 6, 6 adds to the voltage of the dc supply 8, the measured value of the voltmeter 14 is greater than the voltage $V_8$ of the dc supply 8 ($V_{14} > V_8$). Then, when the measured value $V_{14}$ of the voltmeter 14 is higher than the voltage $V_8$ of the dc supply 8 in excess of a predetermined amount (e.g., $V_{14} > 1.01 V_8$), it is judged that no sufficient oil film is formed between the outer and inner raceways and the rolling surface of the rolling elements 6, 6, that is, the rolling bearings 3, 3 are defectively lubricated.

The criterion differs from the case where the rolling elements 6, 6 are made of a metal to the case where the rolling elements are made of ceramics (magnitude relation goes across). In any case, defective lubrication can be detected. Then, when the controller 15 judges that the rolling bearings 3, 3 are defectively lubricated, it suspends the rotation of the main spindle 2 while causing an alarm which is not shown (buzzer or warning light) to given an alarm.

During the operation of machine tools, defective lubrication occurs locally but restoration may occur after an extremely short period of time. Therefore, in a case of that, when the controller 15 suspends the rotation of the main spindle 2 or gives an alarm the moment, and it judges that the rolling bearings 3, 3 are defectively lubricated, it is likely that the emergency suspension of the operation of machine tools or other actions can be conducted more than required. Thus, the controller 15 can be arranged so as to suspend the rotation of the main spindle 2 or give an alarm only when the rolling bearings are kept defectively lubricated for a predetermined period of time (several seconds). Further, during the operation of machine tools (cutting), which a blade supported on the housing 1 and a work supported on the main spindle 2 can come in contact with each other, it may be a case that the housing 1 and the main spindle 2 can be electrically shortcircuited. In this case, the measured value of the voltmeter 14 is substantially zero V. In the case where the rolling elements 6, 6 are made of a metal, when the controller 15 judges that the rolling bearings are defectively lubricated under these conditions, unnecessary emergency suspension of operation is conducted. Therefore, an arrangement may be given such that the lubricating conditions are judged under the condition that the measured value of the voltmeter 14 should be not smaller than a predetermined value (e.g., 0.01 $V_8$).

Further, in the case as shown in FIG. 1, an arrangement is given such that since the magnitude of vibration of the housing 1 detected by the vibroscope 16 is used to judge the operating conditions of the machine tool, it is possible to prevent more securely the occurrence of severe damage on the machine tool. In other words, in the case where some causes make it impossible to judge defective lubrication from the measured value of the voltmeter 14 or the rolling bearings 3, 3 undergo damage such as surface flaking due to the expiration of their life, the rotation of the main spindle 2 can be suspended before damage such as seizing extends to areas other than the rolling bearings 3, 3.

The second embodiment of the present invention will be described hereinafter. In the present embodiment, at least one of the rolling elements 6, 6 (preferably a plurality of rolling elements disposed circumferentially apart from each other, more preferably the whole of the rolling elements) is made of an electrically-conductive ceramics. As the electrically-conductive ceramics constituting the rolling element 6, there may be used any of various known ceramics disclosed in Japanese Patent Laid-Open No. 62-87463, Japanese Patent Laid-Open No. 62-265177, Japanese Patent Laid-Open No. 64-15523, Japanese Patent Laid-open No. 2-43699, Japanese Patent Laid-Open No. 3-29744, Japanese Patent Laid-Open No. 10-87370, Japanese Patent Laid-Open No. 2000-154064, Japanese Patent Laid-Open No. 2000-192969, and Japanese Patent Publication No. 8-16030. Further, a rolling element made of an electrically-conductive ceramics containing from 10 to 60% by weight of one or more selected from the group consisting of nitride, carbide, boride and oxide of transition metal as disclosed in Japanese Patent Application No. 2001-203783 can be used.

As mentioned above, as the electrically-conductive ceramics themselves, there have heretofore been known various materials. Further, the kind of the electrically-conductive ceramics to be used herein is not specifically limited. Accordingly, the description of the electrically-conductive ceramics is omitted. The plurality of rolling elements 6, 6 to be incorporated in the rolling bearings 3, 3 are made of the same kind of a material. In the case where rolling elements made of an electrically-conductive ceramics and rolling elements made of an electrically-nonconductive ceramics are used in admixture, it is necessary that the specific gravity, thermal expansion coefficient, etc. of the two kinds of ceramics be as closed to each other as possible by using the same components as main components of the two kinds of ceramics.

The device for monitoring the operating conditions of a rolling bearing of the present embodiment is arranged such that the potential difference between the housing 1 in which the outer ring 4 is fitted and the main spindle 2 on which the inner ring 5 is fitted can be measured to detect in the state that the rolling bearings 3, 3 in which the aforementioned rolling elements 6, 6 made of an electrically-conductive ceramics are incorporated as in the first embodiment.

While both the first and second embodiment of the present invention have been described with reference to the arrangement such that the conductor 10 is directly connected to the housing 2 in which the outer ring 4 is fitted and the main spindle 2 on which the inner ring 5 is fitted to measure the resistivity or the potential difference between the outer ring 4 and the inner ring 5, the site at which the conductor 10 is connected to the rolling bearings 3, 3 is not limited to these embodiments. The conductor 10 may be directly connected to the outer ring 4 and the inner ring 5 (as shown in FIG. 2). Alternatively, the conductor 10 may be properly connected to members other than housing and main spindle so far as they are electrically connected to the outer ring 4 and the inner ring 5.

In accordance with the device for monitoring the operating conditions of a rolling bearing having the aforementioned arrangement, the defective lubrication of the rolling bearings 3, 3 can be detected before the occurrence of damage on the rolling bearings 3, 3 due to defective lubrication.

Firstly, when the rolling bearings 3, 3 are fairly lubricated, the electrical resistance between the housing 1 and the main spindle 2 is high. On the contrary, when the rolling bearings 3, 3 are defectively lubricated, the electrical resistance between the housing 1 and the main spindle 2 is low. In other words, when the rolling bearings 3, 3 are fairly lubricated, a sufficient oil film is present between the outer and inner raceways and the rolling surface of the rolling elements 6, 6. Since the amount of the oil film as an insulating material is present, the electrical resistance between the housing 1 and the main spindle 2 is high, and hence the potential difference between the housing 1 and the main spindle 2 is raised (so as to be close to the voltage of the do supply 8).

On the contrary, when the lubricating conditions are poor, no oil film is present between the outer and inner raceways and the rolling surface of the rolling elements 6, 6. The amount of oil film, if any, is insufficient. Under these conditions, the outer and inner raceways and the rolling surface of the rolling elements 6, 6 come in substantially direct contact with each other, the electrical resistance between the housing 1 and the main spindle 2 is dropped down, and hence the potential difference between the housing 1 and the main spindle 2 is dropped down. Accordingly, when the measured value $V_{14}$ of the voltmeter 14 is lower than the voltage $V_8$ of the dc voltage 8 under a predetermined amount (e.g., $V_{14} < 0.8\ V_8$), it is judged that no sufficient oil film is formed between the outer and inner raceways and the rolling surface of the rolling elements 6, 6, that is, the rolling bearing is defectively lubricated. Then, when the controller 15 judges that the rolling bearings 3, 3 are defectively lubricated, it suspends the rotation of the main spindle 2 while causing an alarm which is not shown (buzzer or warning light) to given an alarm.

The device for monitoring the operating conditions of a rolling bearing of the present invention has the aforementioned arrangement and action. The monitoring device of the present invention can detect the occurrence of actual defective lubrication before the occurrence of damage due to the defective lubrication, making it possible to effectively prevent various rotary devices such as machine tool from getting out of order due to defective lubrication. The present invention can be used to monitor the operating conditions of not only radial rolling bearing but also thrust rolling bearing.

What is claimed is:

1. A device for monitoring the operating conditions of a rolling bearing, comprising:
    the rolling bearing including: an outer ring made of a metal having an outer raceway provided on the inner surface thereof; an inner ring made of a metal having an inner raceway provided on the outer surface thereof; and a plurality of rolling elements rollably interposed between the outer raceway and the inner raceway;
    a first member electrically connected to the outer ring;
    a second member electrically connected to the inner ring; and
    a lubricant presented on the area at which the outer raceway and the inner raceway come in contact with the rolling surface of the rolling elements;
    wherein the electrical characteristics between the outer ring or first member and the inner ring or second member are monitored in order to monitor the operating conditions of the rolling bearing operating with the lubricant and when the electrical characteristics thus monitored fall outside a predetermined range, the lubricating conditions are judged poor.

2. The device for monitoring the operating conditions of a rolling bearing according to claim 1, wherein the plurality of rolling elements are made of a metal, the electrical characteristics comprise resistivity or potential difference that changes on the basis the resistivity and when the resistivity or potential difference falls below a predetermined value, the lubricating conditions are judged poor.

3. The device for monitoring the operating conditions of a rolling bearing according to claim 1, wherein the plurality of rolling elements are made of ceramics, these rolling elements are rollably retained in a retainer made of a synthetic resin, the electrical characteristics comprise potential difference and when potential difference exceeds a predetermined value, the lubricating conditions are judged poor.

4. The device for monitoring the operating conditions of a rolling bearing according to claim 1, wherein the plurality of rolling elements are made of ceramics, at least one of the rolling elements made of ceramics is made of electrically-conductive ceramics, the electrical characteristics comprise resistivity or potential difference and when the resistivity or potential difference falls below a predetermined value, the lubricating conditions are judged poor.

5. The device for monitoring the operating conditions of a rolling bearing according to claim 1, wherein the first member is a housing and the second member is a main spindle.

6. A device for monitoring the operating conditions of a rolling bearing which holds a metallic main spindle rollably inside a metallic housing, comprising:
    the rolling bearing including: an outer ring made of a metal having an outer raceway provided on the inner surface thereof; an inner ring made of a metal having an inner raceway provided on the outer surface thereof; and a plurality of rolling elements rollably interposed between the outer raceway and the inner raceway, the outer ring being mounted on the housing and the inner ring being mounted on the main spindle; and
    a lubricant presented on the area at which the outer raceway and the inner raceway come in contact with the rolling surface of the rolling elements;
    wherein the electrical characteristics between the outer ring and the inner ring are monitored in order to monitor the operating conditions of the rolling bearing operating with the lubricant and when the electrical characteristics thus monitored fall outside a predetermined range, the lubricating conditions are judged poor.

7. The device for monitoring the operating conditions of a rolling bearing according to claim 6, wherein the plurality of rolling elements are made of a metal, the electrical characteristics comprise resistivity or potential difference that changes on the basis thereof and when the resistivity or potential difference falls below a predetermined value, the lubricating conditions are judged poor.

8. A main spindle for machine tool comprising a device for monitoring the operating conditions of a rolling bearing according to claim 7.

9. The device for monitoring the operating conditions of a rolling bearing according to claim 6, wherein the plurality of rolling elements are made of ceramics, these rolling elements are rollably retained in a retainer made of a synthetic resin, the electrical characteristics comprise potential difference and when the potential difference exceeds a predetermined value, the lubricating conditions are judged poor.

10. A main spindle for machine tool comprising a device for monitoring the operating conditions of a rolling bearing according to claim 9.

11. The device for monitoring the operating conditions of a rolling bearing according to claim 6, wherein the plurality of rolling elements are made of ceramics, at least one of the rolling elements made of ceramics is made of electrically-conductive ceramics, the electrical characteristics comprise resistivity or potential difference that changes on the basis thereof and when the resistivity or potential difference falls below a predetermined value, the lubricating conditions are judged poor.

12. A main spindle for machine tool comprising a device for monitoring the operating conditions of a rolling bearing according to claim 11.

13. A main spindle for machine tool comprising a device for monitoring the operating conditions of a rolling bearing according to claim 6.

* * * * *